UNITED STATES PATENT OFFICE.

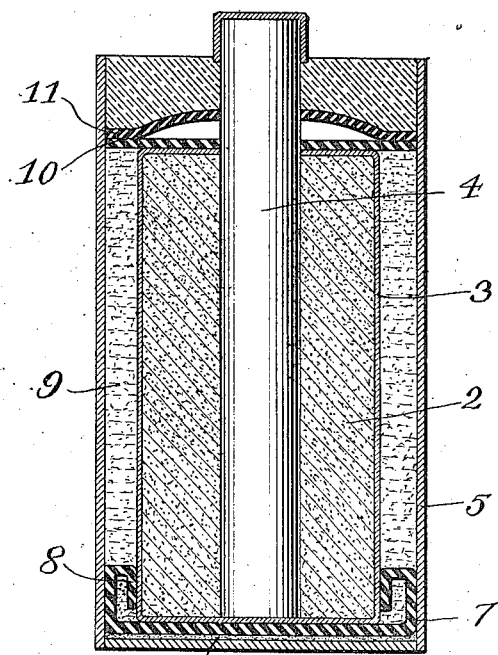
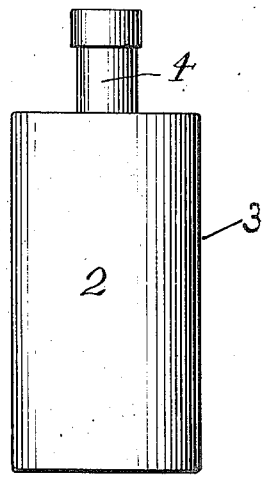
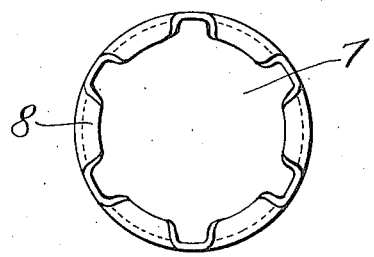

HENRY WILHELM AND HAROLD OLANETA, OF BROOKLYN, NEW YORK.

BATTERY AND METHOD OF MAKING SAME.

1,283,005.  Specification of Letters Patent.  Patented Oct. 29, 1918.

Application filed August 10, 1917. Serial No. 185,408.

*To all whom it may concern:*

Be it known that we, HENRY WILHELM and HAROLD OLANETA, citizens of the United States, residing at Brooklyn, in the county of Kings and State of New York, have invented certain new and useful Improvements in Batteries and Methods of Making Same, of which the following is a specification.

This invention relates to batteries, more particularly to that class known as dry batteries, the object of the invention being to provide an improved knock-down battery and method of making the same whereby the manufacture of the battery is very much simplified, the expense thereof reduced and a longer lived battery obtained.

A further object of the invention is the provision of an improved cartridge and method of making the same which can be readily used in the manufacture of this improved knock-down battery and which cartridge made up of any suitable formula and containing a carbon is wrapped with a substantially non-porous material such as paper whereby the body of which the cartridge is made and the paste in the cup will be prevented from running together.

Heretofore in the formation of dry batteries the cartridge has been covered with a porous material such as cloth, usually cheese-cloth, in consequence of which when the exciter or paste was poured in around the cartridge and then cooked, the result was that the material inclosed within the cloth wrapper and that surrounding it percolated through the wrapper and became equalized, in other words, an endosmotic action took place resulting in a battery in which the life thereof was very much shortened. In the present improvement, however, the cartridge is wrapped with a material such as paper which prevents this action from taking place and in the formation of the battery the paste surrounding the cartridge is first cooked and the cartridge squeezed in place in the previously cooked paste, thus preventing the percolation of the materials through the wrapper and thereby materially prolonging the life of the battery.

In the drawings accompanying and forming a part of this specification Figure 1 is a vertical sectional view of this improved knock-down battery; Fig. 2 is a side view of the cartridge and Fig. 3 is a top view of the fluted insulating centering means for centering the cartridge in the case.

Similar characters of references indicate corresponding parts in the several figures of the drawings.

In the present improvement the cartridge 2 made of any suitable formula sufficient to leave it in a reasonably hard condition so that it can be handled to permit it to be wrapped, is wrapped with paper 3 held thereon in any suitable way as by windings of thread. This cartridge of course contains the carbon 4 and the ends of the paper are tucked in so as to completely inclose the body of the cartridge. Into the bottom of a zinc cup 5 is inserted a suitable paste 6 and then into the cup is inserted an insulating centering disk 7 having fluted edges 8 adapted to closely engage the lower end of the cartridge when the same is inserted therein to properly space and hold the cartridge in position. After the cartridge is inserted in the cup the exciter 9 is placed therein. This exciter comprises a suitable paste which is cooked before it is placed in the cup. In practice the lower disk and cartridge with the disk on the cartridge are inserted as one member into the cup and this may also be done with the upper disk 10. On top of the cartridge and paste is located a washer or disk 10 which is of insulating material to center the cartridge and then on top of this washer or disk is located another disk 11 bulged up to form an air space between the two disks. Then into the upper end of the cup is placed a suitable sealing material whereupon the battery is ready for use. In the present instance, as stated, the exciter is in the form of a cooked paste cooked prior to the time it is inserted into the cup whereupon when the cartridge is placed in the cup it is squeezed into the paste. Heretofore, however, the exciter was in the form of a liquid subsequently cooked after it was placed in the cup by cooking the whole battery together which caused the equalizing of the material of which the cartridge is formed and of the exciter or paste around the cartridge which was permitted by the porous formation of the wrapping around the cartridge thereby materially shortening the life of the battery. In the present improvement, however, by reason of the fact that the cartridge is wrapped with paper not having sufficient porosity to permit the body of the cartridge and the paste surrounding the same to mix, the equalization or endosmotic action of the substance is prevented and especially is this so by reason of the fact that the paste surrounding the cartridge is cooked prior to the time it is placed in the cup.

From the foregoing it follows that a user may purchase the necessary materials comprising a complete cartridge wrapped in the manner stated, a zinc cup and the necessary disks and assemble these materials when ready for use to form the battery since he may use a flour paste as the exciter, previously cooked, and by then placing it in the cup and squeezing the cartridge into position and sealing the several parts by some suitable sealing material such as sealing wax, plaster of Paris, the battery is ready for use.

The main feature of the present improvement consists in the making of a cartridge and of a battery in which endosmotic action is prevented by the use of a suitable substantially non-porous material such as paper or analogous materials separating the cartridge from the paste or exciter surrounding it. As stated by an authority on this subject—

"If a manufacturer could discover some method of construction so that each cell would be exactly like the best which he can produce, it would be a great achievement in the improvement of quality. Some of the reasons for variation are known and others are mysterious. There is no doubt that care in selection and purification of material, and more especially care in assembling them, are important factors. A product which has a comparatively high rate of deterioration will show greater non-uniformity in the hands of the users than will a product which has a low rate, this being due to the variation in the period from manufacture to use."

We have discovered that batteries up to the present time have been manufactured as good as the material would allow the manufacturer in his mode of procedure, and he has left the depreciation of life, intensity of light, inability to remain on the shelf, and short circuiting of same to mysterious forces commonly called local action.

We have discovered that the depreciation of life and intensity of light is caused by elements forming a light endosmose of the paste becoming supersaturated with the oxids chlorids and metallic elements, caused by the direct contact of the paste, which is in direct contact with the metallic elements such as zinc. All of these in time deposit on the cartridge which causes the depreciation in life and the intensity of light, therefore these materials that have been consumed by the cartridge and has deteriorated both life and light should have been retained in the paste and this is one of the defects that the paper overcomes.

Inability to remain on the shelf, is caused by different temperatures and variations of the mixtures of the paste. One being more saturated than the other would cause more action on the cartridge by depositing more of the oxid in the cartridge while not in use, and which the paper overcomes.

Short circuiting of a battery is caused by the impurities of the zinc, these impurities forming light oxids and depositing on the cartridge causes the short circuit of a battery, and which the paper overcomes as the oxids do not go through the paper and do not get into the cartridge.

All these local actions and all these defects are formed by endosmose in all batteries made previous to this, therefore by using paper or any other close material we prevent endosmose in all kinds of dry batteries.

By the term "substantially non-porous" as used herein and in the claims is meant a material or paper that is closely woven, and which has no perceptible openings or open pores therein, that is a paper or material in which the pores cannot be perceived by the naked eye, and possibly only by means of a very powerful magnifying glass. Rice paper is an example of such a paper. By the use of a thin flexible paper or other tissue without perceptible holes, and which is closely woven, and which is capable of being humid, it acts as a conductor between the paste and depolarizer, and is sufficient to pass the ions through without having the paste come into direct contact with the depolarizer.

By pouring in the paste mixture in liquid form and having it gelatinized by standing or cooking both acids are equalized (endosmose) and this makes the battery inferior, first by getting the paste solution which is very weak into the depolarizer, which cuts more life off the cell than if they had been kept separated and second by having the solution in the depolarizer which is stronger acting on the zinc while in the paste.

Endosmose cannot be prevented when liquids are used nor can it be prevented by pouring in liquids the way batteries are usually made or by pouring in the liquid and then waiting for it to solidify or by cooking the same.

We cook the paste before it goes into the battery and the cartridge is one solid mass and when they are in the battery they are kept totally separated except for the humidity that is in the paper to enable contact to be made for the ions to pass. Where there are no free liquids at any time endosmose cannot take place of different densities of solutions solidified or different kinds of acids solidified.

We also prevent by the paper an endosmose of the cartridge by the super oxids which eventually form in all electrolyte batteries, for while the paper on the cartridge is humid for the passage of the ions it is close enough for the arrest of all heavier than humidity.

We claim as our invention:

1. The method of making a cartridge for a battery which consists in forming a suitable body with an electrode therein and then wrapping it with a substantially non-porous material.

2. The method of making a cartridge for a battery which consists in forming a suitable body with an electrode therein and then wrapping it with a substantially non-porous material such as paper.

3. A cartridge for a battery consisting of a body having an electrode therein and wrapped with a substantially non-porous material.

4. A cartridge for a battery consisting of a body having an electrode therein and wrapped with a substantially non-porous material comprising paper.

5. The method of making a battery which consists in first providing a cartridge wrapped with a substantially non-porous material, then inserting the cartridge into a cup, then inserting a cooked paste around the cartridge, and then sealing the so-assembled parts.

6. The method of making a battery which consists in providing a cup and a closely woven paper wrapped cartridge, inserting the latter into the former and then surrounding the cartridge with a paste and sealing the battery.

7. The method of making a battery which consists in providing a cup and a paper wrapped cartridge, inserting the latter into the former and then surrounding the cartridge with a previously cooked paste and sealing the battery.

8. The method of making a battery which consists in providing a paper wrapped cartridge, inserting the same in a cup and insulating and centering it from the cup by a fluted disk, then inserting a previously cooked paste around the cartridge, and then sealing the assembled parts.

9. A dry battery comprising a cup, a paper wrapped cartridge therein, and a previously cooked paste surrounding the cartridge.

10. A dry battery comprising a cup, a paper wrapped cartridge therein, and a previously cooked paste surrounding the cartridge, the cartridge being centered and spaced from the cup at one end by a fluted disk.

11. A dry battery comprising a cup, a paper wrapped cartridge therein, and a previously cooked paste surrounding the cartridge, the cartridge being centered and spaced from the cup at one end by a fluted disk and at the other end by a pair of spaced disks.

12. A knock-down battery comprising a cup, a paper wrapped cartridge therein, a previously cooked paste surrounding said cartridge and means at both ends of the cartridge for centering and insulating the cartridge.

13. A knock-down battery comprising a cup, a paper wrapped cartridge therein, a previously cooked paste surrounding said cartridge, and means at both ends of the cartridge for centering and insulating the cartridge, the means at one end comprising a fluted disk.

14. A knock-down battery comprising a cup, a paper wrapped cartridge therein, a previously cooked paste surrounding said cartridge and means at both ends of the cartridge for centering and insulating the cartridge, the means at one end comprising a pair of spaced disks.

15. A knock-down battery comprising a cup, a closely woven paper wrapped cartridge therein, a previously cooked paste surrounding said cartridge, and means at both ends of the cartridge for centering and insulating the cartridge, the means at one end comprising a fluted disk and at the other end a pair of spaced disks.

16. A cartridge for a battery consisting of a body having an electrode therein and wrapped with closely woven paper in which the pores are imperceptible to the naked eye.

17. A dry battery comprising a container, a closely woven paper wrapped cartridge therein and a previously cooked paste surrounding the cartridge.

HENRY WILHELM.
HAROLD OLANETA.